United States Patent [19]
Yoo

[11] Patent Number: 5,369,347
[45] Date of Patent: Nov. 29, 1994

[54] SELF-DRIVEN ROBOTIC CLEANING APPARATUS AND DRIVING METHOD THEREOF

[75] Inventor: Chang-Hyun Yoo, Suwon-city, Rep. of Korea

[73] Assignee: Samsung Electronics Co., Ltd., Kyungki-Do, Rep. of Korea

[21] Appl. No.: 36,859

[22] Filed: Mar. 25, 1993

[30] Foreign Application Priority Data

Mar. 25, 1992 [KR] Rep. of Korea .................. 92-4858

[51] Int. Cl.⁵ .................. B62D 1/02; G06F 15/50; G01S 15/00
[52] U.S. Cl. .................. 318/568.12; 15/319; 364/424.02; 367/99; 318/587
[58] Field of Search .................. 318/560, 567, 568.1, 318/568.11, 568.12, 568.13, 568.16, 568.17, 652, 587; 15/319; 180/167, 169; 340/686; 364/424.01, 424.02, 449, 559; 367/99, 909; 901/1

[56] References Cited

U.S. PATENT DOCUMENTS

| | | | |
|---|---|---|---|
| 4,465,155 | 8/1984 | Collins | 180/169 |
| 4,815,008 | 3/1989 | Kadonoff et al. | 364/513 |
| 4,920,520 | 4/1990 | Gobel et al. | 367/99 |
| 5,204,814 | 4/1993 | Noonan et al. | 364/424.02 |
| 5,293,955 | 3/1994 | Lee | 318/587 |

FOREIGN PATENT DOCUMENTS

60-93524 5/1985 Japan.

Primary Examiner—Bentsu Ro
Attorney, Agent, or Firm—Sughrue, Mion, Zinn, Macpeak & Seas

[57] ABSTRACT

A self-driven robotic cleaning apparatus and method thereof which can reduce the production cost and shorten the cleaning time and thereby increase a cleaning efficiency, comprising: an infrared heat detecting circuit which senses infrared heat emitted form a human body and pet animals to thereby output a signal sensed from the same to the microprocessor; a front/rear operation motor driving circuit for receiving a driving signal outputted from the microprocessor to thereby rotate driving wheels in either a front or rear direction, a steering motor driving circuit for receiving the driving signal generated from the microprocessor to rotate the wheels and thereafter to change the direction of the wheels; an ultrasonic wave transmitting circuit for receiving an ultrasonic wave transmitting signal from the microprocessor to thereafter transmit the ultrasonic waves; an ultrasonic wave receiving circuit for receiving the ultrasonic waves transmitted from the ultrasonic wave transmitting circuit after the waves are reflected from an obstacle and thereafter for inputting a signal to the microprocessor indicating receipt of the ultrasonic waves by the ultrasonic wave receiving circuit; and a cleaning motor driving circuit for receiving the driving signal from the microprocessor to drive a cleaning motor and thereafter to perform a cleaning job.

7 Claims, 9 Drawing Sheets

SELF-DRIVEN ROBOTIC CLEANING APPARATUS AND DRIVING METHOD THEREOF

BACKGROUND OF THE INVENTION

1. Field of the Invention

The present invention relates to a self-driven robotic cleaning apparatus and driving method thereof, and more particularly to a self-driven robotic cleaning apparatus and driving method thereof which cleans a toilet bowl after a cat comes around the bowl, relieves itself and leaves the bowl.

2. Description Of The Prior Art

A conventional self-propelled robotic cleaning apparatus is shown and described in Japanese laid open patent Application No. Sho 60-93524.

Figure 8:
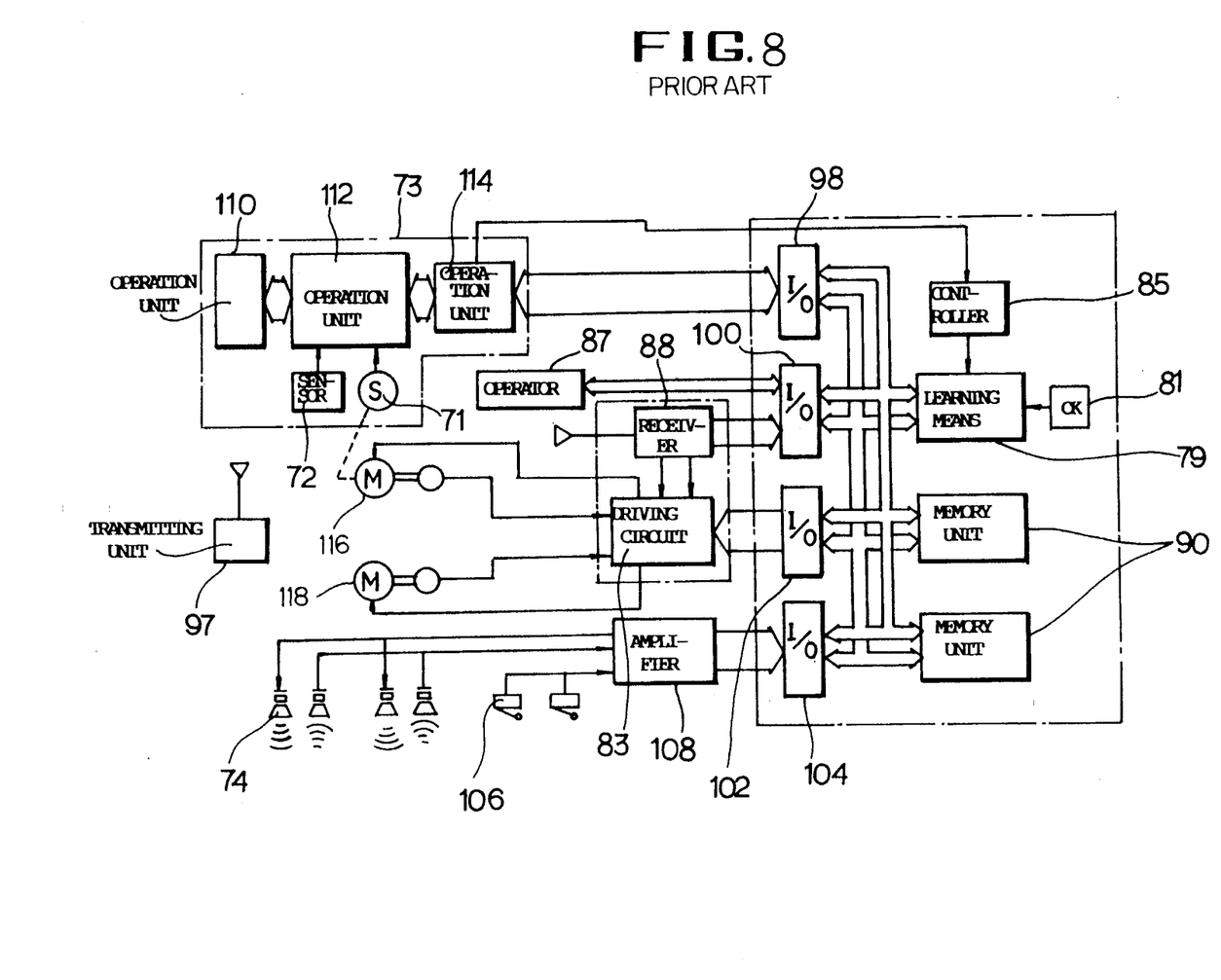
FIG 8 is a block diagram of a self-driven robotic cleaning apparatus in accordance with a prior art.
Figure 9:
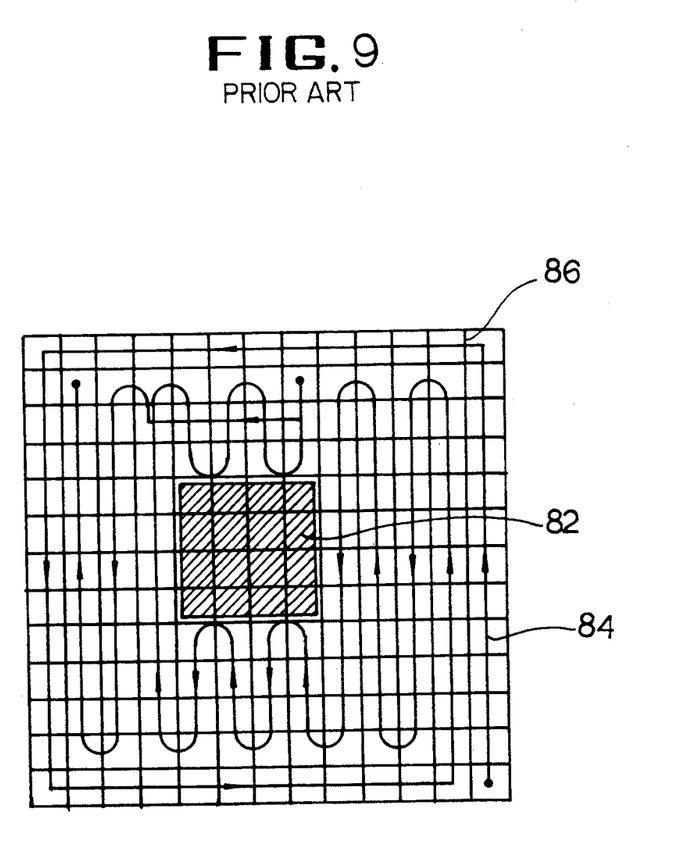
FIG. 9 is a drawing for illustrating a trace which the self-driven robotic cleaning apparatus as shown in FIG. 8 has left within the cleaning region of space.

The self-driven robotic cleaning apparatus described in the application, as illustrated in FIG. 8, comprises a sensor 71 for detecting a travel distance of a robot; a sensor 72 for detecting a variation of travel directions; a position 20 discrimination means 73 whereby a robot position on a two-dimensional coordinate can be obtained by an operation based on outputs of the two sensors 71 and 72; and a learning means 79 for memorizing, on a gridded map, a travel region of the robot that corresponds to a unit block 86, as illustrated in FIG. 9, of the two-dimensional coordinate.

In FIG. 8, a reference numeral 87 is an operating unit, 88 is a receiving unit, 83 is a driving circuit, reference numerals 98, 100, 102 and 104 are input/output ports, reference numeral 90 covers memory units, ROM and RAM, 81 is a clock for generating clock pulses, 85 is a controller, 74 is an ultrasonic sensor for detecting an obstacle, 106 is a contact sensor.

Likewise, a reference numeral 108 is an amplifier, 116 and 118 are wheel driving motors, 97 is a transmitting unit, and reference numerals 110, 112 and 114 are operation units.

Accordingly, the self-driven robotic cleaning apparatus thus constructed, having a cleaning trace as illustrated in FIG. 9, is embodied to sense that the cat has been to the toilet bowl 82 in response to a sensor (not shown), and starts to move after a predetermined time has elapsed after the cat has been to the toilet bowl 82.

At this moment, as illustrated in FIG. 9, the robotic cleaning apparatus cleans a portion dirtied by the cat's foot prints and the like within a region of cleaning space, moving linearly in the cleaning space.

In FIG. 9, a reference numeral 82 is a toilet bowl, and an arrow 84 represents a direction in which the self-driven robotic cleaning apparatus travels.

Meanwhile, the self-driven robotic cleaning apparatus thus constructed is separately mounted with a sensor 71 for detecting a travel distance of the robot and a sensor 72 for detecting a variation of travel directions in addition to an ultrasonic sensor 74 for detecting an obstacle and an infrared sensor (not shown) for detecting a movement of the cat. Thus, the prior art had the drawback of increased manufacturing cost of the robot resulting from multitudes of sensors mounted on the robot.

Furthermore, because the robot cleans the region of space by moving linearly, it takes several minutes for the robot to clean, thereby causing a lack of cleaning efficiency.

Accordingly, it is an object of the present invention to provide a self-driven robotic cleaning apparatus and a driving method thereof, which can lower the manufacturing cost of the robot and shorten the cleaning time, thereby cleaning more efficiently.

SUMMARY OF THE INVENTION

In accordance with one aspect of the present invention, there is provided a self-driven robotic cleaning apparatus by which the aforementioned goals can be attained, the cleaning apparatus comprising: a charging & power source for generating a direct current; a microprocessor for receiving the direct current generated from the charging & power source; a key input circuit which receives an operating condition and command from a user and thereafter outputs the same to the microprocessor; an infrared heat detecting circuit for sensing infrared heat emitted from a human body and pet animals to thereby output a sensed signal of the same to the microprocessor; a front/rear operating motor driving circuit for receiving a driving signal outputted from the microprocessor to thereby rotate driving wheels in either a front or rear direction; a steering motor driving circuit for receiving the driving signal generated from the microprocessor to rotate the wheels and thereafter to change the directions of the wheels; an ultrasonic wave transmitting circuit for receiving an ultrasonic wave transmitting signal from the microprocessor to thereafter transmit the ultrasonic waves; an ultrasonic wave receiving circuit for receiving the ultrasonic waves transmitted from the ultrasonic wave transmitting circuit after the waves are reflected from an obstacle and thereafter input a signal to the microprocessor indicating receipt of the ultrasonic waves by the ultrasonic wave receiving circuit; and a cleaning motor driving circuit for receiving the driving signal from the microprocessor to drive a cleaning motor and thereafter to perform a cleaning job.

In accordance with another aspect of the present invention, there is provided a method for driving a self-driven robotic cleaning apparatus (hereinafter referred to as cleaner) which cleans the area surrounding a toilet bowl (hereinafter referred to as bowl) when the cat has left the bowl after the same has relieved itself at the bowl, wherein, a flag FLAG is defined as representing "1" when an operation for changing a distance between the cleaner and the bowl has been completed, and is defined as representing "0" when the operation has not been completed, a flag DN is defined as representing "1" when the moving direction of the cleaner is changed to the right in order for the cleaner to approach the bowl, and is defined as representing "−1" when the moving direction of the cleaner is changed to the left in order for the cleaner to retreat from the bowl, the flag FLAG is established as "1", the flag DN is established as "1",
   an initial value against a flag Cd representing a distance between the cleaner and the entrance of the bowl is inputted,
   an inner diameter of the bowl is inputted,
   a maximum distance SMax where the cleaner should be displaced from the bowl and stand by is established by the user,
   a minimum distance SMin where the cleaner should approach the bowl is established by the user,
   the method for driving the self-driven robot cleaner comprising the steps of:

initializing by establishing a flag Δ Cd which represents an incremental distance to be changed between the cleaner and the bowl as ΔCd=SMax×(−1/20);

measuring a distance from the cleaner to the bowl by transmitting ultrasonic waves;

discriminating a first position as to whether the cleaner is positioned on a place displaced from the entrance of the bowl;

discriminating a second position as to whether the cleaner is positioned on a place facing the entrance of the bowl when it is discriminated at the first position discriminating step that the cleaner is not positioned on a place deviated from the entrance of the bowl area at the first position discriminating step;

discriminating a direction change time as to whether the present time is the appropriate time to change the direction of the cleaner when it is discriminated at the second position discriminating step that the cleaner is positioned on a place facing the entrance of the bowl;

operating a distance by adding the distance represented by the flag Cd to a changed distance represented by the flag ΔCd to thereby calculate a distance to be changed between the cleaner and the bowl and to thereafter input the distance to be changed into the flag Cd when it is discriminated at the direction change time discriminating step that the present time is the appropriate time to change the progressing direction of the cleaner;

indicating a distance operation completion on the flag FLAG that an operation on the distance to be changed has been completed;

discriminating a maximum distance arrival for discriminating whether the cleaner is farther away from the bowl than the maximum distance SMax; and stopping the movement of the cleaner and standing by when it is discriminated at the maximum distance arrival discriminating step that the cleaner is farther away from the bowl than the maximum distance SMax.

BRIEF DESCRIPTION OF THE DRAWINGS

For a better understanding of the nature and objects of the invention, reference should be made to the following detailed description taken in conjunction with the accompanying drawings in which.

DETAILED DESCRIPTION OF THE INVENTION

In FIG. 1 through FIG. 6, a reference numeral 8 is a charging & power source unit for outputting a direct current voltage, and a reference numeral 1 is a microprocessor for receiving the direct current voltage from the charging & power source unit 8.

Figure 1:
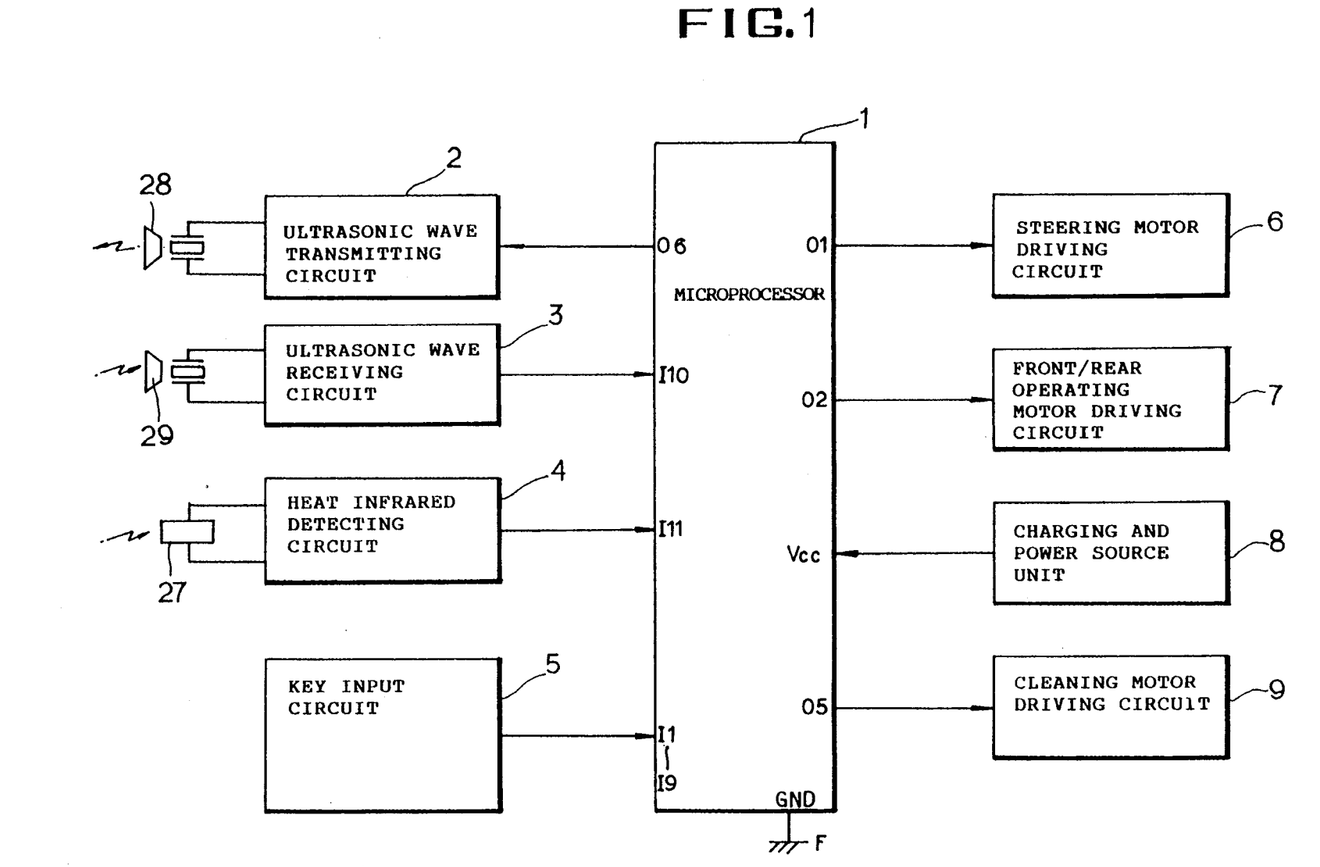
FIG. 1 is a block diagram explaining an embodiment of a self-driven robotic cleaning apparatus in accordance with the present invention.
Figure 2:
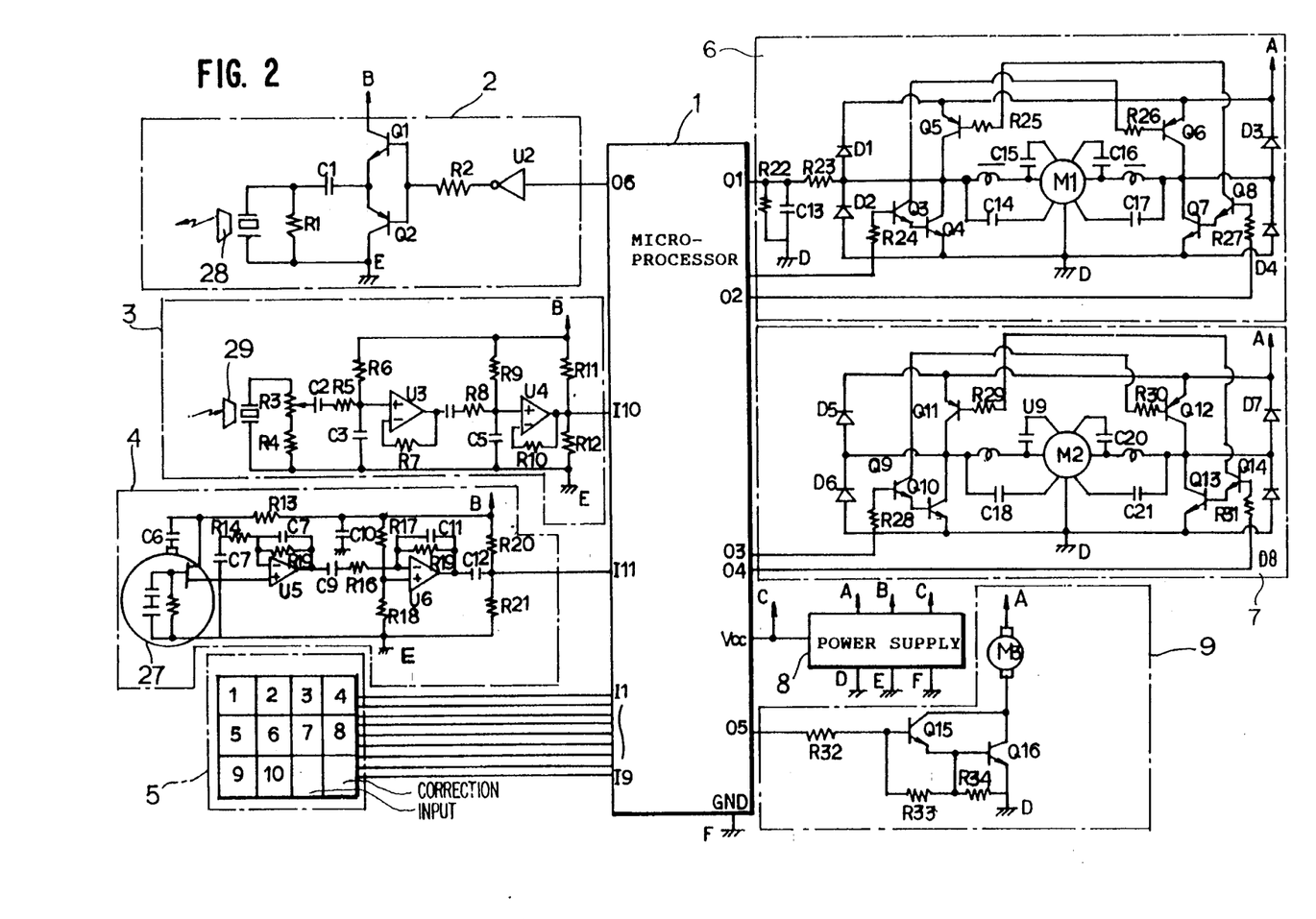
FIG. 2 is a detailed circuit diagram of FIG. 1.

A reference numeral 5 is a key input circuit for receiving an operating condition and operating command from a user to thereby output the same to the microprocessor, a reference numeral 4 is an infrared heat detecting circuit for detecting infrared heat rays from a human or a pet (for instance, a cat) to thereby output a signal from the infrared heat detecting circuit to the microprocessor 1.

A reference numeral 7 is a front/rear operating motor driving circuit for receiving a driving signal outputted from the microprocessor 1 to thereby rotate a front-/rear operating motor M2, so that a driving wheel 32 can be turned either to the front or to the rear direction.

A reference numeral 6 is a steering motor driving circuit for receiving the driving signal outputted from the microprocessor 1 to thereby rotate a steering motor M1, so that a moving direction of the driving wheels 32 can be changed either to the left or to the right as indicated by in an arrow 38.

A reference numeral 2 is an ultrasonic wave transmitting circuit for receiving an ultrasonic wave transmitting signal from the microprocessor 1 to thereby transmit ultransonic waves, a reference numeral 3 is an ultrasonic wave receiving circuit for, when ultrasonic waves transmitted from the ultrasonic wave transmitting circuit 2 are reflected from the bowl 24, receiving the reflected ultrasonic waves to thereby input into the microprocessor 1 a signal indicating that the ultrasonic waves have been received.

A reference numeral 9 is a cleaning motor driving circuit for receiving a driving signal outputted from the microprocessor 1 to thereby drive a cleaning motor M3 and to thereafter perform a cleaning job.

Figure 4A:
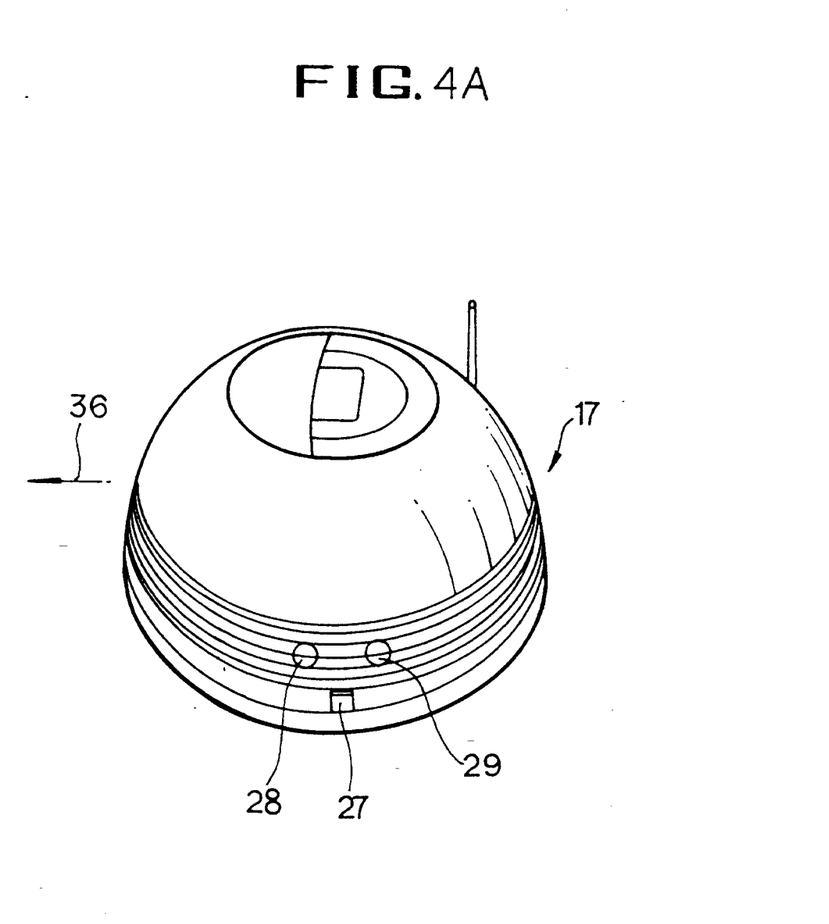
FIG. 4A is a side view showing an external appearance of the self-driven robotic cleaning apparatus as illustrated in FIG. 1.
Figure 4B:
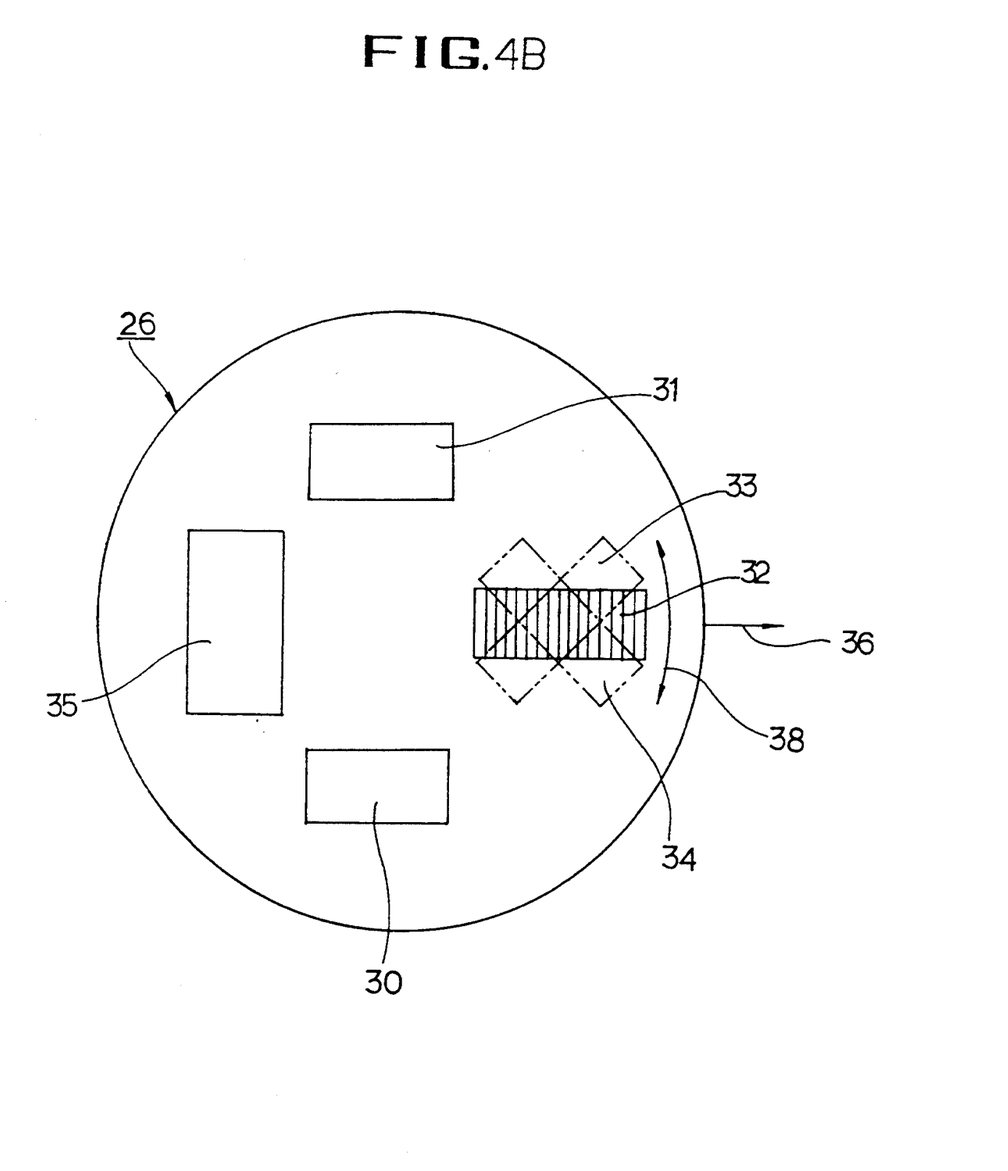
FIG. 4B is a drawing of a bottom surface of the self-driven robotic cleaning apparatus as illustrated in FIG. 4A.

Meanwhile, in FIGS. 4A and 4B, an arrow 36 represents a moving direction of the self-driven robotic cleaning apparatus, a reference numeral 28 represents an ultrasonic wave transmitting sensor, 29 is an ultrasonic wave receiving sensor and a reference numeral 27 represents an infrared heat detecting sensor.

In FIG. 4B, a reference numeral 35 is a suction hole for suctioning in soils, 30 and 31 are supporting rollers, a reference numeral 33 represents a position when the driving wheel 32 is rotated to the left, and 34 represents a position when the driving wheel 32 is rotated to the right.

Figure 6:
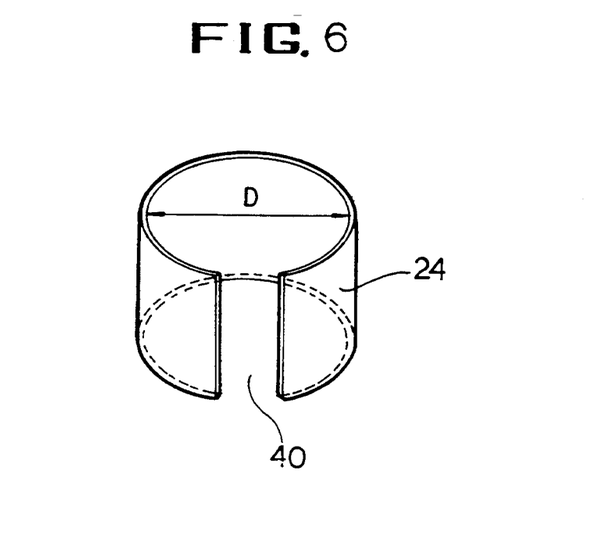
FIG. 6 is a side view of a toilet bowl as shown in FIG. 5.

Meanwhile, as seen in FIG. 6, the cat's toilet bowl 24 as used in the preferred embodiment is open at one end, so that the cat can enter and leave the bowl through this opening 40. To and from the bowl, ultrasonic waves are transmitted and received to thereby make the self-driven robotic cleaning apparatus 26 grasp its position.

Figure 3:
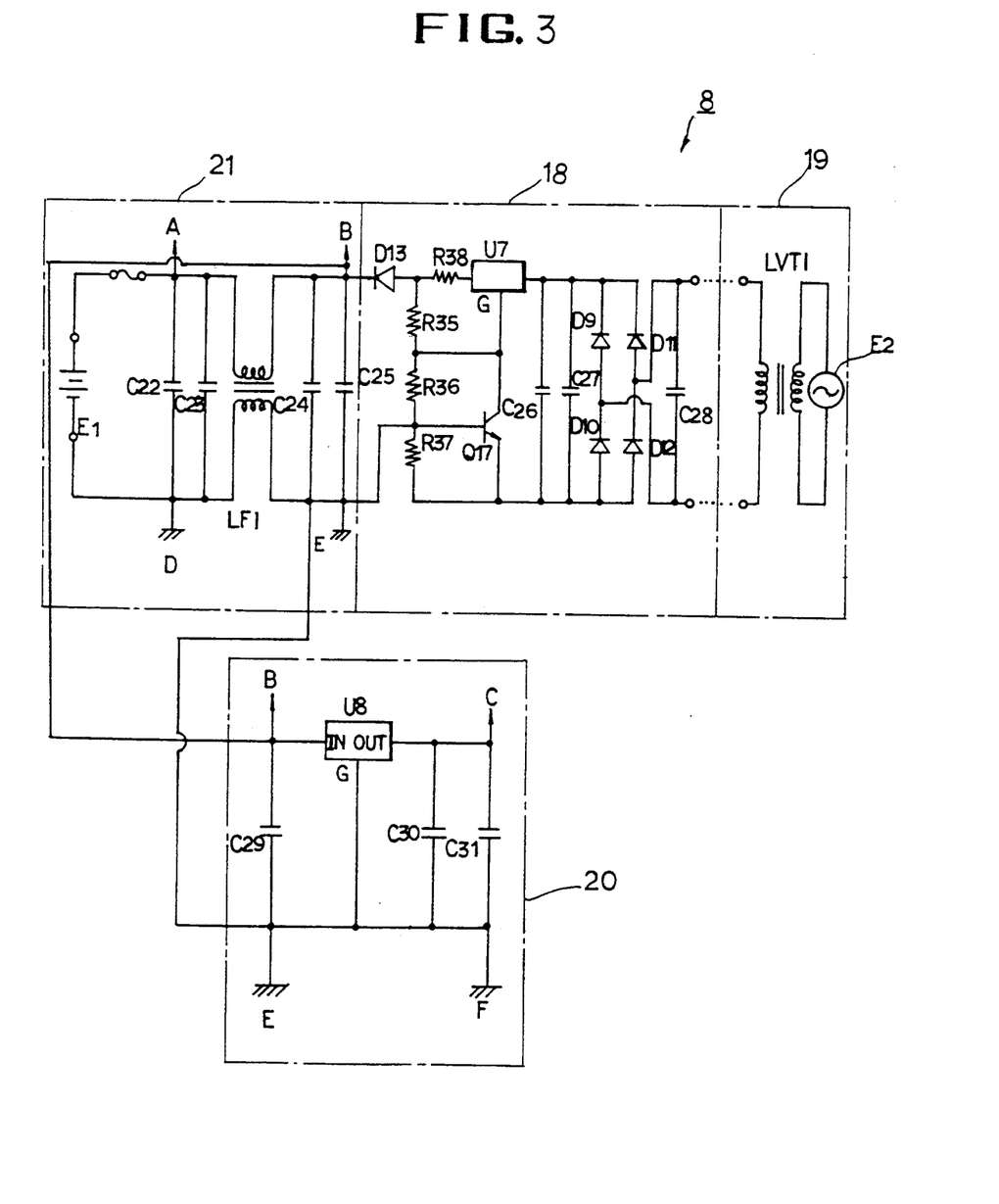
FIG. 3 is a detailed circuit diagram of a charging and power source unit as illustrated in FIG. 2.

In FIG. 3 the charging & power source unit 8 comprises charging circuits 19 and 18 and power source circuits 21 and 20.

The charging circuit 19 comprises an external power source E2 for outputting an alternating current voltage of 220 V and an adapter LVT1 for receiving the alternating current voltage of 220 V from the external power source E2 to thereby output an alternating current voltage of 12 V.

Another charging circuit 18 comprises a voltage regulator V7, diodes D9, D10, D11, D12 and D13, capacitors C26, C27 and C28, resistors R35, R36, R37 and R38, and a transistor Q17.

The power source circuit 21 comprises a chargeable battery E1, capacitors C22, C23, C24 and C25, and a line filter LF1. In the power source circuit 21, a supply terminal of a direct current voltage 12 V and a ground terminal D mounted on one end of the line filter LF1 are connected to the steering motor driving circuit 6, the front/rear operating motor driving circuit 7 and the cleaning motor driving circuit 9, a supply terminal B of a direct current voltage 12 V and a ground terminal E mounted on the other end of the line filter LF1 are connected to the ultrasonic wave transmitting circuit 2, ultrasonic wave receiving circuit 3 and the infrared-heat detecting circuit 4.

As seen from the foregoing, the line filter LF1 separates the supply terminals A and B of the direct current voltage 12 V respectively, and the reason the ground terminals D and E are respectively separated is to prevent noise from entering the microprocessor 1.

Meanwhile, the other power source circuit 20 comprises a voltage regulator U8 for receiving a direct current voltage of 12 V to thereafter output a direct current voltage of 5 V and capacitors C29, C30 and C31 for stabilizing input/output voltages of the voltage regulator U8.

An input terminal of the voltage regulator U8 is connected to the supply terminal B of the direct current voltage 12 V in the power source circuit 21, and an output terminal C of the voltage regulator U8 is connected to a power source terminal VCC of the microprocessor 1, and a ground terminal F at the output side of the voltage regulator U8 is connected to a ground terminal GND of the microprocessor 1.

Meanwhile, in FIG. 2, the key input circuit 5 comprises a matrix encompassing a number key ranging from 1 through 10 (or 0) for establishing a cleaning region of space and inputting a cleaning intensity, an input key and a correction key. An established value of the cleaning region of space and cleaning intensity and the like inputted to the key input circuit 5 are stored on an internal memory of the microprocessor 1 and unless the same are changed by the user through the key input circuit 5, the microprocessor 1 will memorize the same.

The infrared-heat detecting circuit 4 comprises an infrared-heat sensor 27, amplifiers U5 and U6 and an amplifying circuit comprised of peripheral elements.

Meanwhile, the front/rear operating motor driving circuit 7 comprises driving transistors Q9, Q10, Q11, Q12, Q13 and Q14, a peripheral circuit thereof, a front-/rear operating motor M2 and transistor protecting diodes D5, D6, D7 and D8, and enables the self-driven robotic cleaning apparatus 26 to move forwardly and backwardly.

The steering motor driving circuit 6 comprises driving transistors Q3, Q4, Q5, Q6, Q7 and Q8 and a peripheral circuit thereof, a steering motor M1 which is a direct current motor and transistor protecting diodes D1, D2, D3 and D4, and enables the self-driven robotic cleaning apparatus 26 to change direction to the left or to the right.

Meanwhile, the ultrasonic wave transmitting circuit 2 comprises a NOT gate U2, transistors Q1 and Q2 and an ultrasonic wave transmitting sensor 28.

The ultrasonic wave receiving circuit 3 comprises an ultrasonic wave receiving sensor 29, amplifiers U3 and U4 and an amplifying circuit comprised of peripheral elements.

The microprocessor 1 discriminates a distance from the bowl by way of a time delay for receiving from the ultrasonic wave receiving circuit 3 the ultrasonic waves emitted from the ultrasonic wave transmitting circuit 2 to thereby perform a pertinent operation.

The cleaning motor driving circuit 9 comprises transistors Q15 and Q16 and peripheral elements thereof and a cleaning motor M3 which is a direct current motor.

The cleaning motor M3 joins a vacuum cleaning unit within the self-driven robotic cleaning apparatus 26.

As seen from the foregoing, the self-driven robotic cleaning apparatus 26 in accordance with the present invention is not equipped with a power source switch, instead it is programmed to detect a presence of human, a cat or the like within a region of space and to automatically, operate after a disappearance of the movement of the human or the animal.

An embodiment of the self-driven robotic cleaning apparatus in accordance with the present invention thus constructed will be described in the following.

Figure 7:
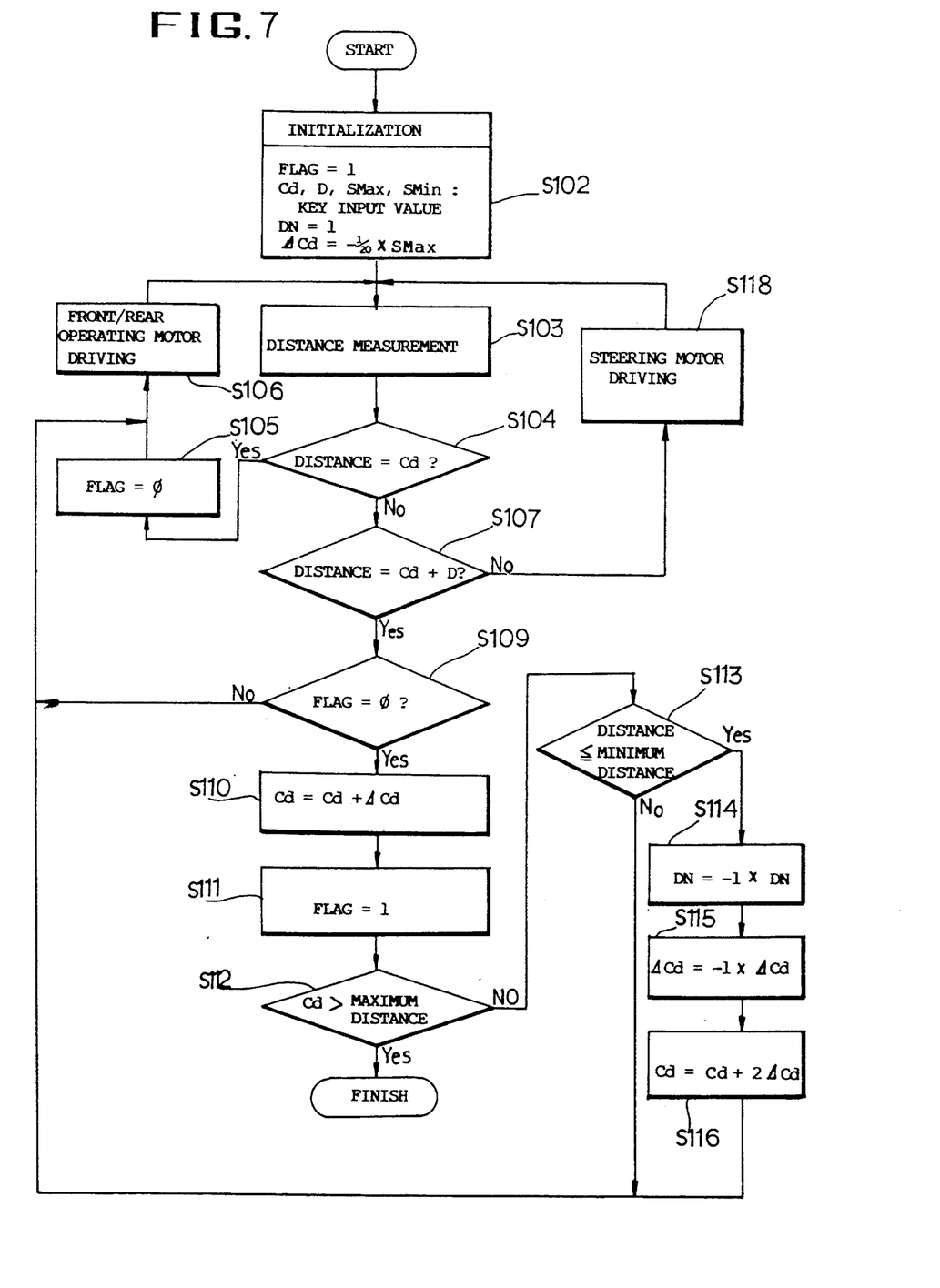
FIG. 7 is a flow chart of a control method of the self-driven robotic cleaning apparatus in accordance with an embodiment of the present invention.

First of all, an explanation is given with reference to FIG. 7.

As an initial condition for operation, a flag FLAG is defined in the microprocessor 1 as indicating "1" when an operation to change the distance between the cleaner and the bowl has been completed and is defined as indicating "0" when the operation has not been completed.

And in the microprocessor 1, a flag DN is defined as indicating "1" when he moving direction of the cleaner is changed to the right in order for the cleaner to get closer to the bowl, and is defined as indicating "−1" when the moving direction of the cleaner is changed to the left to retreat from the bowl.

Next, the user charges a power source in the battery E1 of the power source circuit 21 through the charging circuits 19 and 18. Next, the adapter LVT1 and external power source E2 are separated from the charging circuit 18 and power source circuits 21 and 20.

Next, the user establishes the flag FLAG as "1" through the key input circuit 5 in order to indicate that an operation on a distance to be changed between the cleaner 26 and bowl 24 has been completed.

Then, the user establishes the flag DN as "1" through the key input circuit 5 in order to change the progressing direction of the cleaner to the right.

Next, the user inputs on the key input circuit 5 an initial value against the flag Cd which represents a distance between the cleaner 26 and the entrance 40 of the bowl 24.

Here, a straight distance between the cleaner 26 under the present state and the entrance 40 of the bowl 24 is inputted as the initial value of the flag Cd.

Next, the user inputs the inner diameter D of the bowl 24 on the key input circuit 5.

The user then establishes in the key input circuit 5 the maximum distance SMax as a value the user wants, the maximum distance being a distance from the cleaner 26 to the bowl 24, and the user establishes the minimum distance SMin between the cleaner 26 and the bowl 24 in the key input circuit 5.

Next, the user establishes the flag ΔCd, which represents the incremental distance to be changed between the cleaner 26 and the bowl 24, as $$\Delta Cd = (SMax \times (-1/20))$$

through the key input circuit 5, step S 102.

Next, when the cat has been in the periphery of the bowl 24, the microprocessor 1 detects the cat's body heat through the infrared heat detecting sensor 27 which indicates that the cat has been to the bowl 24.

After the cat has gone and a predetermined period for time has elapsed, ultrasonic waves are transmitted from the ultrasonic wave transmitting circuit and received by the ultrasonic wave receiving circuit to thereby measure a distance from the present position of the cleaner 26 to the bowl 24, step S 103.

Next, the microprocessor 1 compares the distance mentioned in the step S 103 with a distance represented by the flag Cd to determine whether the two distances are the same to thereafter discriminate whether the cleaner 26 is positioned in a place to the right of the entrance 40 of the bowl 24, step S 104.

Figure 5:
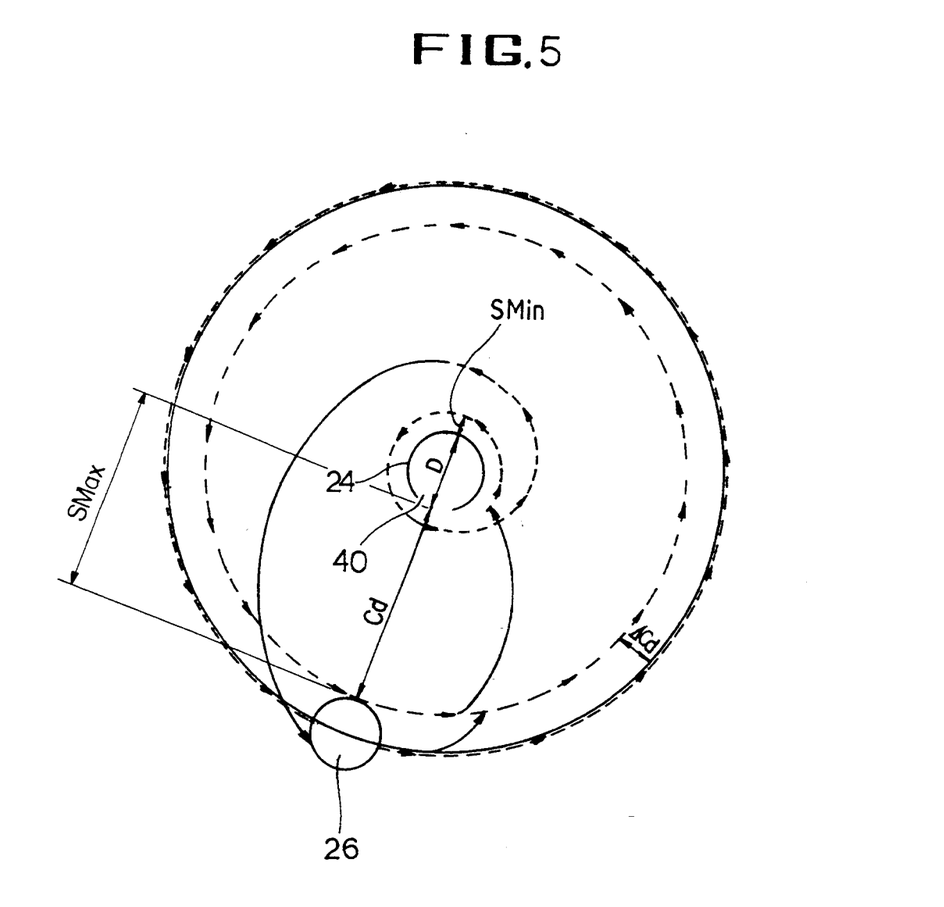
FIG. 5 is a drawing illustrating a trace which the self-driven robotic cleaning apparatus as shown in FIG. 4A has left within a cleaning region of space by way of a driving method of the self-driven robotic cleaning apparatus in accordance with an embodiment of the present invention.

Next, if in an initial position illustrated in FIG. 5, the distance between the cleaner 26 and the bowl 24 is different from the distance represented by the flag Cd, the microprocessor 1 assumes that the cleaner 26 is not positioned in a place deviated from the entrance 40 of the bowl 24 (discriminated as NO) and thereby proceeds to the step S 107.

At the step S 107, the microprocessor 1 compares the distance between the cleaner 26 and the bowl 24 with the distance represented by the flag Cd added by the inner diameter D of the bowl 24 to thereafter discriminate whether or not the cleaner 26 is positioned in front of and near the entrance of the bowl 24.

Next, if at the initial position illustrated in FIG. 5, the distance from the cleaner 26 to the bowl 24 equals a value wherein the distance represented by the flag Cd is added by the inner diameter D of the bowl 24, the microprocessor 1 discriminates that the cleaner 26 is positioned in a place facing the entrance 40 of the bowl 24 (discriminated as YES) to thereby advance to the step S 109.

Next, at the step S 109, the microprocessor 1 checks the value represented by the flag FLAG as to whether the same is "0" to thereby discriminate whether the present time is a time to change the moving direction of the cleaner 26.

At this point, if the value represented by the flag FLAG is "0" (in case of YES), the microprocessor 1 discriminates that the present time is the time the cleaner 26 should change the moving direction to thereby advance to the step S 110.

At the step S 110, the distance represented by the flag Cd is added by the changed distance represented by the flag ΔCd to thereby calculate a distance to be changed between the cleaner 26 and the bowl 24, so that the distance to be changed is inputted to the flag Cd.

Next, at the step S 111, the microprocessor 1 inputs "1" to the flag FLAG, so that an indication is displayed that an operation on the distance to be changed has been completed.

Next, at the step S 112, the microprocessor 1 checks whether the distance represented by the flag Cd is larger than the maximum distance SMax to thereby discriminate whether the cleaner 26 is farther from the bowl 24 than the maximum distance SMax.

At this moment, if the distance represented by the flag Cd is larger than the maximum distance SMax (in case of YES), the microprocessor 1 discriminates that the cleaner 26 is much farther from the bowl 24 than the maximum distance SMax to thereby disrupt the movement of the cleaner 26 and to thereafter stand Meanwhile, at the step S 104, when it is discriminated by the microprocessor 1 that the cleaner 26 is on a position deviated from the entrance 40 of the bowl (in case of YES) because the distance from the cleaner 26 to the bowl 24 is the same distance represented by the flag Cd, then the flow advances to the step S 105.

At the step S 105, the microprocessor indicates that an operation on the distance to be changed has not been completed by establishing the flag FLAG as "0".

The process then advances to the step S 106 and a driving signal is outputted from an output terminal 02 of the microprocessor 1 to thereby make the front/rear operating motor M2 rotate toward the front and make the cleaner advance forward along the arrow 36.

At the same time, a driving signal is outputted from an output terminal 05 of the microprocessor 1 to thereby make the cleaning motor M3 rotate, so that a cleaning job is performed, and the soil is suctioned into the cleaner 26 through the suction hole 35.

Next, the process advances to the aforementioned step S 103 and repeats the aforementioned operations.

Meanwhile, at the aforementioned step S 107, when it is discriminated that the cleaner 26 is not positioned on a place facing the entrance 40 of the bowl 24 (in case of NO) because the distance from the cleaner 26 to the bowl 24 is not the same as the distance represented by the flag Cd added by the inner diameter D of the bowl 24, then the process proceeds to the step S 118.

At the step S 118, a driving signal is outputted for a predetermined period of time from the output terminal 01 of the microprocessor 1 to the steering motor driving circuit 6, so that the driving wheel 32 is rotated 30 degrees to a direction represented by the flag DN and the driving wheel maintains this 30 degree-rotated state for a predetermined period of time (for instance, approximately 5 seconds).

Next, a returning driving signal is outputted from the output terminal 01 of the microprocessor 1 to the steering motor driving circuit 6 to thereby make the driving wheel 32 return to a normal position toward the front.

The process then proceeds to the aforementioned step S 103 and repeats the aforementioned operations.

Meanwhile, when the value represented by the flag FLAG at the step S 109 is not "0", (in case of NO), the microprocessor 1 discriminates that the present time is not a time to change the advancing direction of the cleaner 26 and advances to the step S 106.

Next, at the step S 106 and the steps subsequent to the step 106, the aforementioned steps are repeated.

Meanwhile, if the distance represented by the flag Cd is not larger than the maximum distance SMax at the step S 112, (in case of NO), the microprocessor 1 discriminates that the cleaner 26 is displaced from the bowl 24 to a place within the maximum distance SMax, and flow proceeds to the step S 113.

At the step S 113, the microprocessor 1 checks whether or not the distance between the cleaner 26 and the bowl 24 is within the minimum distance SMin to thereby discriminate if the cleaner 26 has approached the bowl 24 within the minimum distance SMin.

At the step S 113, because the distance between the cleaner 26 and the bowl 24 is larger than the minimum distance SMin, and if it is discriminated that the cleaner 26 has not approached the bowl 24 within the minimum distance SMin, (in case of NO), flow advances to the aforementioned step S 106.

Next, at the step S 106 and the subsequent steps to the step 106, the aforementioned operations are repeated.

Meanwhile, if the distance between the cleaner 26 and the bowl 24 is within the minimum distance SMin (in case of YES), the microprocessor 1 discriminates that the cleaner 26 has approached the bowl 24 within the minimum distance SMin and advances to the step S 114.

At the step S 114, the microprocessor 1 multiplies the flag DN representing the direction change by "−1" in order to broaden the distance between the cleaner 26 and the bowl 24 to thereby change a code representing the value of the flag DN, so that, when the cleaner 26 changes the moving direction, an indication is displayed to change to the right.

Then, flow advances to the step S 115, the microprocessor 1 multiplies the flag Cd representing the changed distance by "−1" to thereby change a code of value representing the flag $\Delta Cd$, so that the distance to be changed can be gradually increased when the distance to be changed at the step S 110 is calculated.

Next, flow advances to the step S 116, and the value represented by the flag Cd added by twice the value represented by the flag $\Delta Cd$ to thereby calculate the distance to be changed between the cleaner 26 and the bowl 24.

Next, the distance to be changed is inputted to the flag Cd as a new value.

The reason the value represented by the flag Cd is added by twice the value represented by the flag $\Delta Cd$ at the step S 116 is to compensate the value represented by the flag $\Delta Cd$ which has already been added at the step S 110 and to increase the distance to be changed as much value as the one represented by the flag $\Delta Cd$.

At the steps subsequent to the step S 116, flow proceeds to the step S 106 and repeats the aforementioned operations.

According to the operations ranging from S 102 to S 118, the cleaner 26, as illustrated in a dotted arrow at FIG. 5, narrows a circle from the original position and approaches the bowl 24, and after the cleaner approaches as much as the minimum distance SMin, rotates in turn to the same direction as the one approached, and widens the circle to return to the original position for a full stop.

Meanwhile, in the preferred embodiment thus described, the flag $\Delta Cd$ representing the incremental distance by which the distance between the cleaner 26 and the bowl 24 is incrementally changed at the step S 102 is established as $$\Delta Cd = (\Delta SMax) \times (-1/20),$$

however, in accordance with the user's convenience, the flag $\Delta Cd$ can be established as $$\Delta Cd = (\Delta SMax) \times (-1/30).$$

As seen in the self-driven robotic cleaner according to the present invention, the cat's movement is detected by the infrared heat sensor and the distance to the bowl is detected by the ultrasonic sensor to thereby execute the cleaning job, so that the effect of decreasing the manufacturing costs can be achieved by an installation of rather a few sensors.

Furthermore, by the driving method of the self-driven robotic cleaning apparatus in accordance with the present invention, the self-driven robotic cleaning apparatus approaches the bowl in an encircling motion and retreats from the bowl in an encircling motion, so that the cleaner can approach the periphery of the bowl swiftly and cover the distance swiftly, thereby shortening the time of cleaning job and improving the cleaning efficiency.

What is claimed is:

1. A self-driven robotic cleaning apparatus comprising:

a charging and power source for generating a direct current;

a microprocessor for receiving the direct current generated from the charging and power source;

a key input circuit which receives an operating condition and command from a user to thereafter output the same to the microprocessor;

an infrared-heat detecting circuit for sensing infrared-heat emitted from a human body and pet animals to thereby output a sensed signal of the same to the microprocessor;

a front/rear operating motor driving circuit for receiving a driving signal outputted from the microprocessor to thereby rotate driving wheels in front and rear directions;

a steering motor driving circuit for receiving the driving signal generated from the microprocessor to rotate the wheels and thereafter to change the direction of the wheels;

an ultrasonic wave transmitting circuit for receiving an ultrasonic wave transmitting signal from the microprocessor to thereafter transmit ultrasonic waves;

an ultrasonic wave receiving circuit for receiving the ultrasonic wave transmitted from the ultrasonic wave transmitting circuit after the waves are reflected from an obstacle and for inputting a signal to the microprocessor indicating receipt of the ultrasonic waves by the ultrasonic wave receiving circuit; and a cleaning motor driving circuit for receiving the driving signal from the microprocessor to drive a cleaning motor and thereafter to perform a cleaning job.

2. A driving method for a self-driven robotic cleaning apparatus, wherein the driving method comprises: an initialization step for establishing an initial value of a flag in a microprocessor;

a distance measurement step for measuring a distance from the self-driven robotic cleaning apparatus to a structure with an entrance;

a first position determining step for determining whether the self-driven robotic cleaning apparatus is positioned at a place deviated from the structure;

a second position determining step for determining whether the self-driven robotic cleaning apparatus is positioned facing the entrance of the structure, said second position determining step being performed when it is determined at the first position determining step that the self-driven robotic cleaning apparatus is not positioned at a place deviate from the structure;

a direction change timing determining step for determining whether a present time is a time to change a progressing direction of the self driven robotic cleaning apparatus, said direction change timing determining step being performed When it is determined at the second position determining step that the self-driven robotic cleaning apparatus is positioned facing the entrance of the structure;

a distance determining operation and operation completion display step for calculating a changeable distance between the self-driven robotic cleaning apparatus and the structure and for setting the flag indicating that an operation has been completed on the changeable distance, said distance determining operation and operation completion display step being performed when it is determined at the direction change timing determining step that the present time is a time for changing a progressing direction of the self-driven robotic cleaning apparatus;

a maximum distance arrival determining step for determining whether the self-driven robotic cleaning apparatus is substantially deviated from a pre-established maximum distance; and a movement stopping and waiting step for stopping movement of the self-driven robotic cleaning apparatus and then for entering a waiting mode, said movement stopping and waiting step being performed when it is determined at the maximum distance arrival determining step that the self-driven robotic cleaning apparatus is deviated from the structure by more than the maximum distance.

3. A driving method for a self-driven robotic cleaning apparatus as defined in claim 2, wherein the method further comprises:

a distance operation incompletion display step for setting the flag indicating that an operation on the changeable distance has not been completed, said distance operation incompletion display step being performed when it is determined at the first position determining step that the self-driven robotic cleaning apparatus is positioned at a place deviated from the entrance of the structure; and a front/rear operating motor driving step for driving a front/rear operating motor in order to rotate a driving wheel forwardly and to thereafter proceed to the distance measurement step.

4. A driving method for a self-driven robotic cleaning apparatus as defined in claim 2, wherein the method further comprises:

a steering motor driving step for changing a progressing direction of the self-driven robotic cleaning apparatus by as much as an established angle is performed and to thereafter proceed to the distance measurement step, said steering motor driving step being performed when it is determined at the second position determining step that the self-driven robotic cleaning apparatus is not positioned facing the entrance of the structure.

5. A driving method for a self-driven robotic cleaning apparatus as defined in claim 2, wherein the method further comprises:

a front/rear operating motor driving step for driving a front/rear operating motor in order to rotate a driving wheel forwardly and to thereafter proceed to the distance measurement step, said front/rear operating motor driving step being performed when it is determined at the direction change timing determining step that the time is not right for changing the progressing direction of the self-driven robotic cleaning apparatus.

6. A driving method for a self-driven robotic cleaning apparatus as defined in claim 2, wherein the driving method further comprises:

a minimum distance arrival determining step for determining whether the self-driven robotic cleaning apparatus has approached the structure and is within a predetermined minimum distance, said minimum distance arrival determining step being performed when it is determined at the maximum distance arrival determining step that the self-driven robotic cleaning apparatus is not substantially deviated from the maximum distance; and a front/rear operating motor driving step for rotating a front/rear operating motor in order to rotate forwardly a driving wheel and to thereafter proceed to the distance measurement step, said front/rear operating motor driving step being performed when it is determined at the minimum distance arrival determining step that the self driven robotic cleaning apparatus has not approached the structure within the minimum distance.

7. A driving method for a self-driven robotic cleaning apparatus as defined in claim 6, wherein the driving method further comprises:

a progressing direction change and distance operation step for calculating a distance to be changed between the self-driven robotic cleaning apparatus and the structure, wherein the progressing direction of the self-driven robotic cleaning apparatus is changed in order to increase the distance between the self-driven robotic cleaning apparatus and the structure, and thereafter proceed to, the front/rear operating motor driving step, said progressing direction change and distance operation step being performed when it is determined at the minimum distance arrival determining step that the self-driven robotic cleaning apparatus is within the minimum distance of the structure.

* * * * *